(12) United States Patent
Sinha et al.

(10) Patent No.: US 9,734,210 B2
(45) Date of Patent: Aug. 15, 2017

(54) PERSONALIZED SEARCH BASED ON SEARCHER INTEREST

(71) Applicant: LinkedIn Corporation, Mountain View, CA (US)

(72) Inventors: Shakti Dhirendraji Sinha, Sunnyvale, CA (US); Asif Mansoor Ali Makhani, Fremont, CA (US); Viet Thuc Ha, Milpitas, CA (US); Lin Guo, Mountain View, CA (US); Ramesh Dommeti, San Jose, CA (US); Senthil Sundaram, South San Francisco, CA (US); Ganesh Venkataraman, San Jose, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 350 days.

(21) Appl. No.: 14/539,624

(22) Filed: Nov. 12, 2014

(65) Prior Publication Data
US 2016/0034464 A1 Feb. 4, 2016

Related U.S. Application Data

(60) Provisional application No. 62/031,732, filed on Jul. 31, 2014.

(51) Int. Cl.
*G06F 17/30* (2006.01)
*H04L 29/08* (2006.01)
*G06Q 50/00* (2012.01)

(52) U.S. Cl.
CPC .... *G06F 17/3053* (2013.01); *G06F 17/30705* (2013.01); *G06F 17/30867* (2013.01); *G06Q 50/01* (2013.01); *H04L 67/306* (2013.01)

(58) Field of Classification Search
CPC ............................ G06F 17/3053; G06Q 50/01
See application file for complete search history.

(56) References Cited

U.S. PATENT DOCUMENTS 8,972,368 B1 * 3/2015 de Sousa .......... G06F 17/30477
707/705
9,020,965 B1 * 4/2015 Sehrer ................ G06F 17/3053
707/758

(Continued)

FOREIGN PATENT DOCUMENTS

WO WO-2016018471 A1 2/2016

OTHER PUBLICATIONS

"International Application Serial No. PCT/US2015/023116, International Search Report mailed Jun. 29, 2015", 3 pgs.

(Continued)

*Primary Examiner* — Kris Mackes
(74) *Attorney, Agent, or Firm* — Schwegman Lundberg & Woessner, P.A.

(57) ABSTRACT

A system and method for personalized search based on searcher interest may include obtaining a search term from a member of a social network at a user device via the network interface. An initial result may be generated based on the search term, including a first group of content items from a social network and stored in a content database, the content items including member profiles of members of the social network. Each of the content items of the first group may be ranked based on information from an activity database, the activity database storing the information related to the social network, the activities including interactions with search results that include ones of the member profiles. A second group of the content items may be displayed, including at least some of the first group of the content items, based on the rank of the first group of the content items.

20 Claims, 8 Drawing Sheets

(56) References Cited

U.S. PATENT DOCUMENTS

| | | | |
|---|---|---|---|
| 2009/0063284 A1 | 3/2009 | Turpin et al. | |
| 2012/0158720 A1* | 6/2012 | Luan | G06F 17/30867 |
| | | | 707/732 |
| 2012/0166530 A1 | 6/2012 | Tseng | |
| 2013/0218865 A1* | 8/2013 | Angulo | G06F 17/30864 |
| | | | 707/709 |
| 2014/0129552 A1 | 5/2014 | Sinha et al. | |
| 2015/0347411 A1 | 12/2015 | Friggeri et al. | |
| 2016/0034465 A1 | 2/2016 | Sinha et al. | |
| 2016/0034466 A1 | 2/2016 | Sinha et al. | |

OTHER PUBLICATIONS

"International Application Serial No. PCT/US2015/023116, Written Opinion mailed Jun. 29, 2015", 7 pgs.

"U.S. Appl. No. 14/539,688, Non Final Office Action Examiner Interview Summary mailed Feb. 15, 2017", 3 pgs.

"U.S. Appl. No. 14/539,688, Non Final Office Action mailed Dec. 30, 2016", 11 pgs.

"U.S. Appl. No. 14/539,792, Examiner Interview Summary mailed Feb. 15, 2017", 3 pgs.

"U.S. Appl. No. 14/539,792, Non Final Office Action mailed Dec. 28, 2016", 12 pgs.

"International Application Serial No. PCT/US2015/023116, International Preliminary Report on Patentability mailed Feb. 9, 2017", 9 pgs.

\* cited by examiner

PERSONALIZED SEARCH BASED ON SEARCHER INTEREST

RELATED APPLICATIONS

This application claims the benefit of Provisional Application Ser. No. 62/031,732, filed Jul. 31, 2014, which is incorporated herein by reference in its entirety.

TECHNICAL FIELD

The subject matter disclosed herein generally relates to the use of personalized searches based on searcher interest.

BACKGROUND

Online search engines conventionally utilize factors such as keywords, the density of links to a website or content item, and sponsorship to variously rank, organize, and/or display search results. Thus, a website or content item that has a relatively large number of keyword matches as well as a relatively large number of other websites that link thereto may be positioned on a list of search results ahead of a website that has relatively fewer keyword matches or relatively fewer links thereto. The use of sponsorship of a link may be utilized to adjust results or prioritize particular links.

BRIEF DESCRIPTION OF THE DRAWINGS

Some embodiments are illustrated by way of example and not limitation in the figures of the accompanying drawings.

DETAILED DESCRIPTION

Example methods and systems are directed to the use of personalized search based on searcher interest. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Conventional web searches may lack sensitivity to various aspects of information that may be gleaned from factors external to the search itself. Factors from both the searcher and the content to be searched may be utilized to improve the search technology. In particular, search results may be made more pertinent than conventional searches by considering factors from the who is doing the searching rather than focusing on what the searcher entered into a search query. Further, search results may be made more pertinent than conventional searches by factoring in aspects of content to be searched that may be more substantive than simple keywords and a number of links to the content.

Such additional information may be particularly or even uniquely applicable to social networks. Social networks may include member profiles of the users created, at least in part, by the users themselves. Thus, a social network may have a relatively rich information set to analyze to understand what the searcher may be interested in and what kind of searcher may be interested in a particular type of content. Moreover, both within the context of a social network and outside of the social network, search engines may obtain information related to past activities, behaviors, habits, likes, dislikes, and so on of their users and may utilize such information to improve the relevance of their search results.

A search function has been developed that that utilizes information from the searcher as well as the content to be searched to generate search results. In various examples, the search engine may utilize member profile data and user interests based on past searches to inform results of current searches. In various examples, the search engine may utilize behavioral factors based on past activities by the searcher as well as activities by other previous searchers. In various examples, the search engine may utilize a similarity of the searcher's member profile with that of other the member profiles of other searchers to anticipate what the searcher may find interesting or relevant to their search. Such factors may be utilized separately or in combination.

Figure 1:
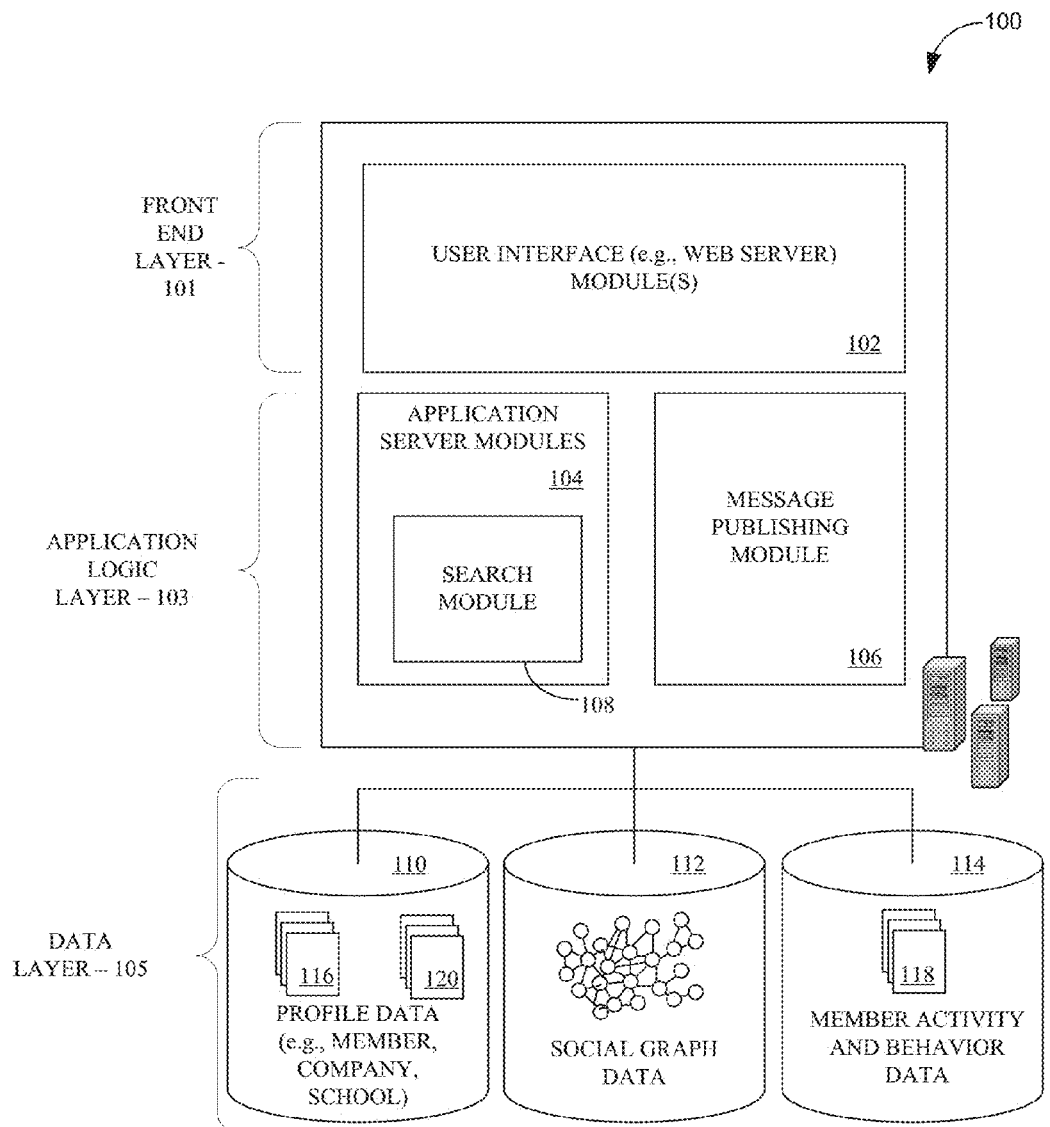
FIG. 1 is a block diagram illustrating various components or functional modules of a social network, in an example embodiment.

FIG. 1 is a block diagram illustrating various components or functional modules of a social network 100, consistent with some examples. The social network 100 may be utilized to provide treaded electronic messages within the user interface of the social network 100. While the threading of electronic messages are described with particular respect to the social network 100, it is to be recognized and understood that the principles described with respect to threaded electronic messages may be applied to any of a variety of platforms and electronic messages beyond those directly applicable to a social network generally.

A front end 101 consists of a user interface module (e.g., a web server) 102, which receives requests from various client-computing devices, and communicates appropriate responses to the requesting client devices. For example, the user interface module(s) 102 may receive requests in the form of Hypertext Transport Protocol (HTTP) requests, or other web-based, application programming interface (API) requests. An application logic layer 103 includes various application server modules 104, which, in conjunction with the user interface module(s) 102, may generate various user interfaces (e.g., web pages, applications, etc.) with data retrieved from various data sources in a data layer 105. In some examples, individual application server modules 104 may be used to implement the functionality associated with various services and features of the social network service. For instance, the ability of an organization to establish a presence in the social graph of the social network 100, including the ability to establish a customized web page on behalf of an organization, and to publish messages or status updates on behalf of an organization, may be services implemented in independent application server modules 104. Similarly, a variety of other applications or services that are made available to members of the social network service may be embodied in their own application server modules 104. Alternatively, various applications may be embodied in a single application server module 104. In some examples, the social network 100 includes a content item publishing module 106, such as may be utilized to receive content, such as electronic messages, posts, links, images, videos, and the like, and publish the content to the social network.

One or more of the application server modules 104, the content item publishing module 106, or the social network 100 generally may include a search module 108. As will be disclosed in detail herein, the search module 108 may identify websites or content items for display based on a search term as entered by a searcher. The search module 108 may utilize member profiles and user activities in the generation of search results. Such member profiles and activities may be from the searcher making a present search or by searches performed by the same or other users in the past. The search module 108 may generate results for a search based on the member profiles and activities as well as conventional search factors, such as keywords and link density. It is to be understood that while the search module 108 is described as an integral component of a social network, the principles described herein may be applied without the search module 108 being an integral part of a social network or even necessarily utilizing data from a social network if behavior information of searchers is available from alternative sources.

As illustrated, the data layer 105 includes, but is not necessarily limited to, several databases 110, 112, 114, such as a database 110 for storing profile data 116, including both member profile data as well as profile data for various organizations. Consistent with some examples, when a person initially registers to become a member of the social network service, the person may be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 110. Similarly, when a representative of an organization initially registers the organization with the social network service, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some examples, a member may elect to "follow" another member. In contrast to establishing a connection, the concept of "following" another member typically is a unilateral operation, and at least with some examples, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph database 112.

Activities by users of the social network 100, including past searches that have been conducted by the search module 108, may be logged as activities 118 in the activity and behavior database 114. Such activities may include search terms, interactions with search results and subsequent engagement with the subject of search results, scores assigned to such search terms, as disclosed herein, communication with others via the social network, engagement with content items posted on the social network, joining groups, following entities, and so forth.

The data layer 105 collectively may be considered a content item database, in that content items 120, including but not limited to member profiles 116, may be stored therein. The data layer 105 may include further databases for the storage of other content items 120, such as posts to a newsfeed, articles or links to websites, images, sounds, event notifications and reminders, and so forth. Additionally or alternatively, content items other than member profiles 116 may be stored in a dedicated content item database or may be stored in the member profiles database 110.

The social network service may provide a broad range of other applications and services that allow members the opportunity to share and receive information, often customized to the interests of the member. For example, with some examples, the social network service may include a photo sharing application that allows members to upload and share photos with other members. With some examples, members may be able to self-organize into groups, or interest groups, organized around a subject matter or topic of interest. With some examples, the social network service may host various job listings providing details of job openings with various organizations.

Although not shown, with some examples, the social network 100 provides an application programming interface (API) module via which third-party applications can access various services and data provided by the social network service. For example, using an API, a third-party application may provide a user interface and logic that enables an authorized representative of an organization to publish messages from a third-party application to various content streams maintained by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
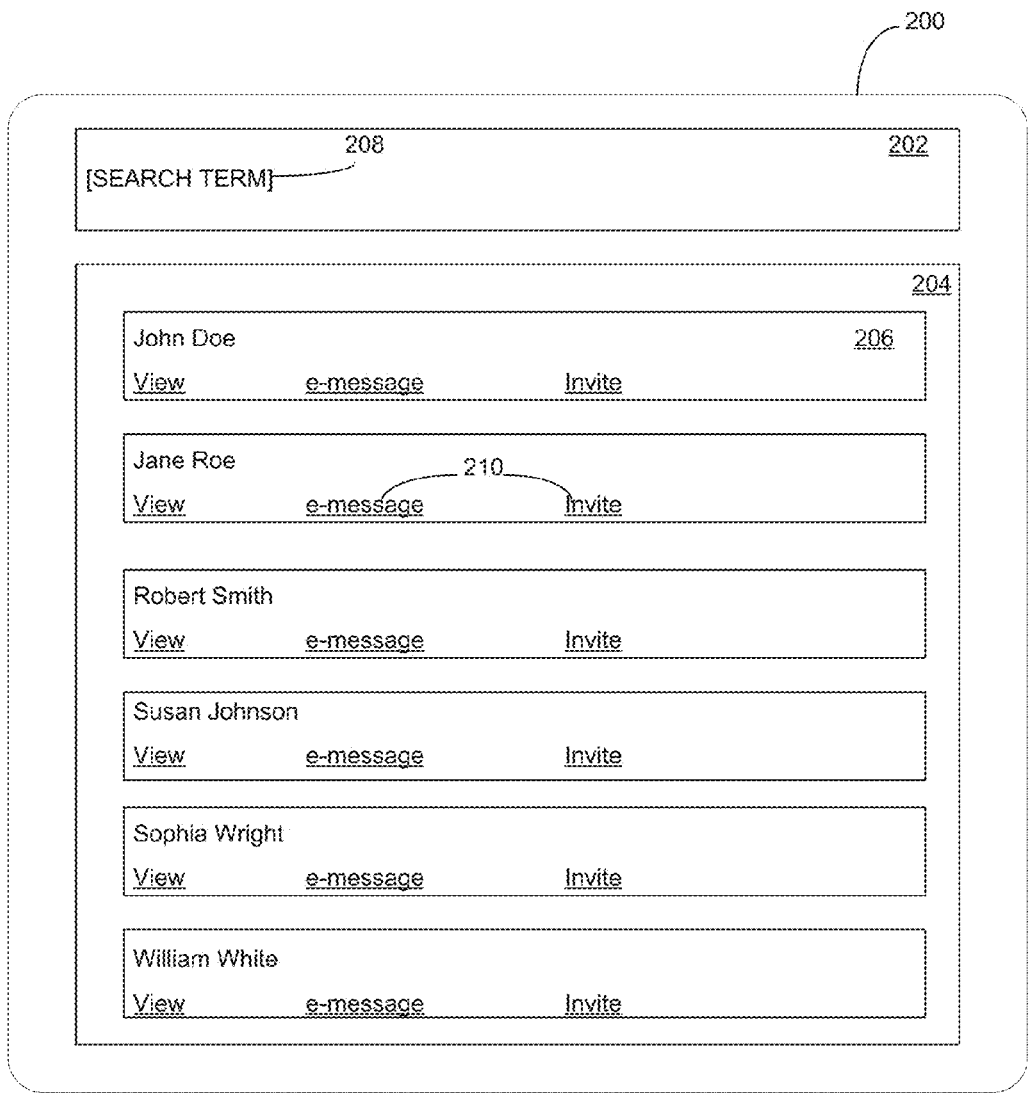
FIG. 2 is an abstract image of a search user interface of a search engine as provided by a search module, in an example embodiment.

FIG. 2 is an abstract image of a search user interface 200 of a search engine as provided by the search module 108, in an example embodiment. The user interface 200 includes a search term entry line 202 and a search results window 204 displaying individual search results 206. In various illustrative examples utilized herein, searches will be discussed with respect to a search by a recruiter of candidates for a job. However, it is to be understood that the principles described herein may be readily applicable to searches of a variety of different types of content, including webpages.

The search module 108 may apply mechanisms described herein to both the searcher as well as the content that is the subject of the search. The search module 108 may utilize factors related to the searcher or other users of the social network 100 to determine what the searcher is likely to want to access. The search module 108 may further utilize factors related to the content to be searched to determine what kind of searcher would want to view that content.

Behavior—Searcher Interest

In various examples, past activities 118 of the searcher may be utilized to identify content that the searcher may be interested in. The use of activities 118 stand in contrast to the use of member profile 116 information and characteristics. By analyzing what content the searcher has found useful in the past, the search module 108 may infer what content the searcher might find useful to display based on the instant search term 208. In an illustrative example, if the searcher has made past searches in which the selections of the results have focused on software engineering job postings, then an instant search term 208 of "Company X" may favor results for job postings in software engineering at Company X over general information for or other content about Company X.

A given first member, i.e., a searcher, may have more than one activities history for the purposes of determining a first member's likely interest. For instance, if the first member is a recruiter the first member may have an activities history in the activities database 114 for different recruiting objectives and/or different jobs. Thus, the recruiter may have a first activities history related to searching for candidates for a first job and a second activities history related to searching for candidates for a second job, and so forth. The different activities histories may be applied depending on the job for which the recruiter is searching for candidates; if the recruiter is searching for candidates for the first job then the activities history for the second job may not necessarily be utilized to inform the results. The search history for the second job may be utilized when the recruiter is searching for the first job if the second job is related to the first job, particularly if the first and second jobs are the same or similar to one another (e.g., if the first job and second jobs are both "software engineers" or the first job is an "electrical engineer" and the second job is a "computer engineer", and so forth).

A searcher interest score may be determined or otherwise obtained based on an analysis of activities 118 by the searcher, including but not limited to activities stemming from previous searches. The activities 118 may be given a decaying significance over time. Thus, relatively recent activities 118 may be weighted more heavily than activities 118 that have occurred farther in the past. The decay may be an exponential decay; in an example, a weight of activities 118 may be reduced by half for every day in the past in which the activity occurred from the time of the entry of the instant search term 208.

An activity 118 may include viewing content 206, messaging a user associated with the content 206, sending an invitation to a user associated with the content 206, such as to connect or interview, recommending the content 206 to other users of the social network 100, and so forth. In various examples, activities 118 may be given an equal score; for instance, a number of activities 118 may simply be added up without respect to what the activity 118 is. In various examples, activities 118 may be given different scores to reflect different levels of engagement with the associated content 206. Thus, for instance, viewing the content 206 may be given a score of "1", communicating with a user associated with the content 206 may be given a score of "2", sending an invitation to the user associated with the content 206 may be given a score of "3", and so forth.

Each activity 118 may include metadata concerning the content or type of content the activity 118 was directed toward. For instance, an activity 118 may have metadata indicating that the activity concerned a job posting for a software engineer position with an experience requirement of three to five years at Company Y in location Z. Each of those metadata may be assigned a score for the activity 118 as disclosed above. Thus, in an example, if the searcher performed a search that turned up the above job profile sixty (60) hours earlier and the searcher sent an electronic message to a contact person, then the score for the activity 118 may be 2*0.25=0.5 (e.g., two points for being a communication activity and a weight of 0.25 for being more than two days prior) and may be assigned to each of the following metadata factors: job posting; software engineer; 3-5 years' experience; Company Y; location Z. In an example, each metadata point of each activity 118 the searcher has conducted over the predetermined time period may be similarly scored.

The weighted score for each metadata point that is the same or similar to other metadata points may be summed together to obtain a score for each metadata point. Thus, the first member may have a score for "job posting" based on the weighted activity score for each activity 118 related to a job posting over the predetermined time period along with a score for "software engineer", "Company Y", and so forth. Thus, if the first member had four (4) activities 118 having "job posting" as metadata, and those activities had scores of 0.5, 0.75, 0.4 and 0.5, then the "job posting" score for the first member may be 2.15 while if the first member had five (5) activities 118 having "software engineer" as metadata, and those activities had scores of 1.5, 0.9, 0.4, 1.0, and 0.8, then the "software engineer score for the searcher may be 4.6.

Upon obtaining the scores for the metadata of the relevant activities 118, the search module 108 may compare the metadata scores against metadata for each of a first group of search results 206. The first group of search results may be obtained according to conventional search techniques, including but not limited to keyword searching and the like. For instance, if a search result 206 includes metadata for "job posting" and "software engineer" then, in the above example, the search result 206 may be given a score of 2.15+4.6, or 6.75.

In an example, each search result 206 in the first group may be given a score in the same way. The search results 206 may then be ranked according to their score. A second group of search results 206 may be formed according to the rank of the search results 206 of the first group. The second group may include some or all of the search results 206 of the first group. In various examples, the second group may include only those search results 206 that exceed a predetermined threshold score or may include only a predetermined number of the search results 206 with the highest scores.

As such, the ordering of the search results 206 may favor metadata characteristics of previous activities 118 with which the searcher has been particularly active. As described above, if the searcher has been particularly interested in job postings for software engineers in location Z then a search for Company X may result in search results 206 that include job postings for software engineers in location Z for Company X to be displayed relatively high on the search results window 204 because the metadata for job postings, software engineers, and location Z may have relatively high scores. Similarity In various examples, the member profile 116 of the searcher may be utilized to find other member profiles 116 that are similar to the member profile 116 of the searcher. Two member profiles 116 may, for the purposes of the search module 108, be similar if the members associated with the member profiles 116 would find or be expected to find the same or similar search results 206 relevant to the same or similar search term 208. On the basis of similar member profiles 116, a searcher who has relatively few activities 118 (for instance, if the searcher is relatively new to the social network 100 or has been inactive recently) have search results modified based on activities 118 that have been done by other members with similar member profiles 116 to the searchers.

Similarity may be identified based on similar member profile characteristics of the member profiles 116. Thus, two member profiles 116 that each have an employment characteristic of "software engineer" may have greater similarity in employment than two member profiles 116 where one has an employment characteristic of "software engineer" and the other has an employment characteristic of "author". Characteristics need not necessarily be identical to promote similarity. For instance, while member profiles 116 that are both "software engineers" may have a similarity of 1.0 for an employment member profile characteristic, member profiles 116 where one is a "software engineer" and the other is a "mechanical engineer" may have a similarity of 0.8 while a "software engineer" may have a similarity of 0.3 with a member profile 116 that is an "electrician" in an employment member profile characteristic. These principles may be extended through a variety of member profile characteristics, including, but not limited to, age, gender, education, employer, experience, school, languages, skills, groups, interests, location, and the like. The total similarity score may be based on a sum, average, or other combination of individual member profile characteristic scores.

Characteristics may be determined to be the same or similar based on an analysis of content in the social network 100. For instance, the social network 100 may note a prevalence of the same terms together or used interchangeably. Thus, while an "electrical engineer" and an "electronics engineer" may not necessarily be the same profession, the social network 100 may determine, based on the uses of those terms, that "electrical engineer" and "electronics engineer" are the same or essentially the same for the purposes of comparing employment member profile characteristics.

Figure 3:
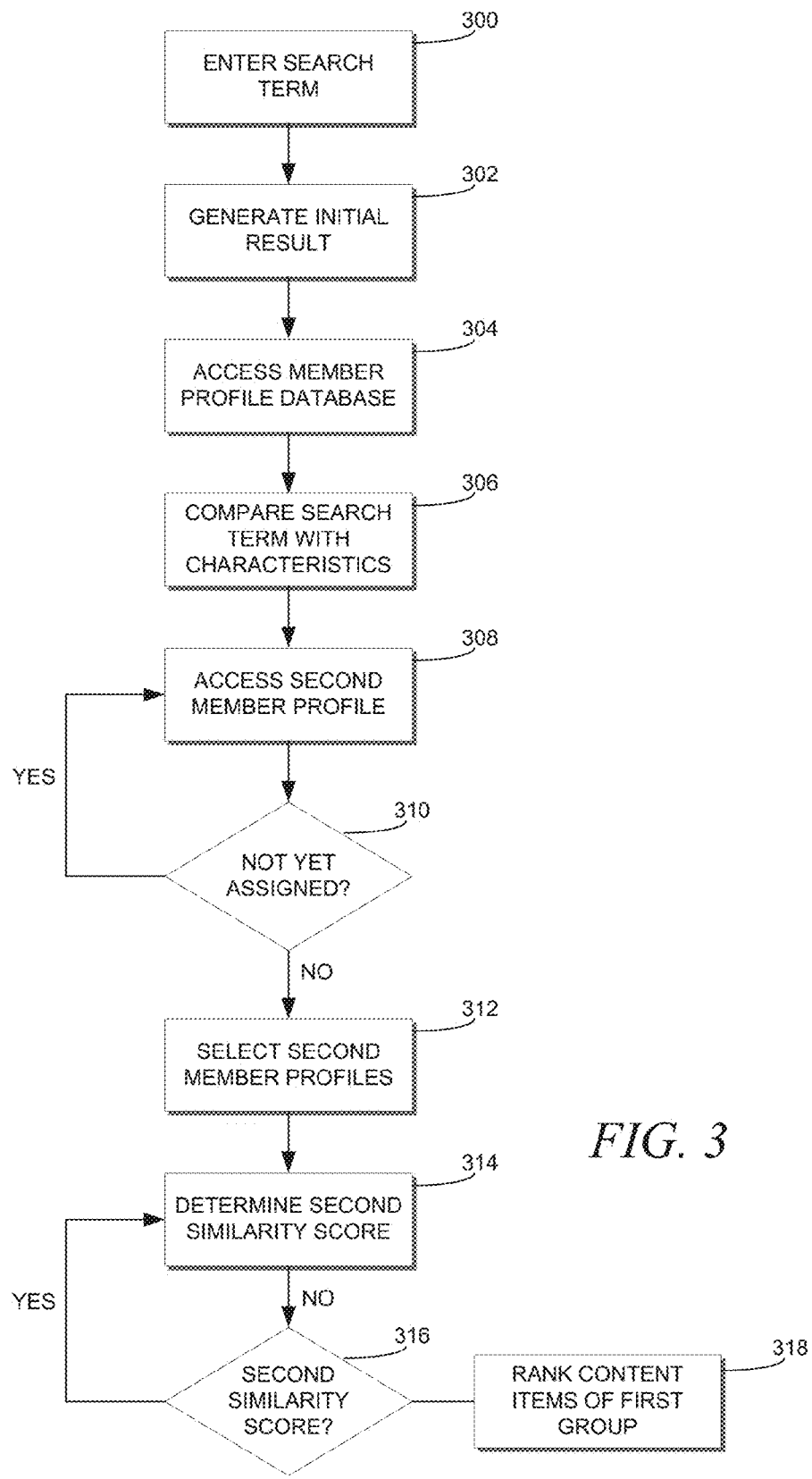
FIG. 3 is a flowchart for determining similarity between a first member profile of a searcher and second member profiles of other members of the social network, in an example embodiment.

FIG. 3 is a flowchart for determining similarity between a first member profile 116 of a searcher and second member profiles 116 of other members of the social network, in an example embodiment.

At 300, the searcher corresponding to the first member profile 116 enters a search term 208.

At 302, the search module 108 may generate an initial result including a first group of content items 120 from the data layer 105. The search module 108 may generate the initial result using conventional search techniques, such as keyword matching and the like.

At 304, the search module 108 may access the member profile database 110 for the first member profile 116 of the member who entered the search term 208. The first member profile 116 includes member profile characteristics as disclosed herein. While the first member profile 116 may include space for various member profile characteristics for which data is not available (e.g., the first member profile 116 may include member profile characteristics for education and location but not gender), the first member profile 116 and other member profiles 116 may, in various examples, be deemed to only possess or otherwise have certain member profile characteristic if the member profile characteristics are affirmatively entered into the member profile 116 or there is an automatic default; no data may be deemed to mean the member profile 116 does not possess the associated member profile characteristic.

At 306, the search module 108 may compare the search term 208 with the member profile characteristics of the first member profile 116 to identify member profile characteristics that are pertinent to the search term 208 to form a subset of the member profile characteristics. Thus, if the search term is "software engineer Bay Area," the search module 108 may identify member profile characteristics for career ("software engineer") and location ("Bay Area") as being pertinent and part of the subset of member profile characteristics.

At 308, the search module 108 may accesses a second member profile 116 from the member profile database 110 and compare the subset of member profile characteristics of the second member profile 116 with the subset of member profile characteristics of the first member profile 116 and assign a similarity score to each of the member profile characteristics of the subset of the second member profile 116. The similarity score may be assigned in the manner described above to create a first similarity score for the second member profile 116 based on the subset of member profile characteristics. The first similarity scores may be based on a sum of the similarity scores of the member profile characteristics, an average of the similarity scores, or another suitable mathematical operation.

At 310, the search module 108 determines if member profiles 116 in the member profile database 110 have not yet been assigned a first similarity score. If not, the search module returns to 308 to access a new second member profile and determine and first similarity score. If not, the search module proceeds to 312.

In various examples, the population of eligible member profiles 116 is all member profiles 116 in the member profile database 110. In various examples, the population of eligible member profiles 116 is less than all of the member profiles 116 in the member profile database 110. In an example, only member profiles 116 that have been active during a predetermined period of time, such as one year, are accessed. Additional mechanisms may be utilized to reduce the population of eligible member profiles 116.

At 312, the search module 108 selects some of the second member profiles 116 based on the first similarity scores for the individual second member profiles 116. In an example, a predetermined number of second member profiles 116 having the highest first similarity scores are selected. In an example, all second member profiles 116 having a first similarity score higher than a threshold are selected. The selected second member profiles 116 may be considered the subgroup of second member profiles 116.

At 314, the search module 108 determines a second similarity score for a second member profile 116 of the subgroup. The second similarity score may be computed based on all of the member profile characteristics of the first member profile 116 in relation to the same member profile characteristics that are possessed by the second member profile 116. Thus, if the first member profile 116 has member profile characteristics for gender, age, experience, education, and location, and the second member profile 116 has member profile characteristics for experience, education, location, and employer, then the second similarity score would be based on experience, education, and location, i.e., the member profile characteristics of the first member profile 116 also possessed by the second member profile 116.

At 316, the search module 108 determines if any second member profiles 116 of the subgroup do not yet have a second similarity score. If so, the search module 108 selects a new second member profile 116 of the subgroup and returns to 314. If not, the search module 108 proceeds to 318.

At 318, the search module 108 may rank the content items of the first group according to the second similarity scores. The search module 108 may weight the search results by multiplying or otherwise applying the second similarity scores to the search results in a manner related to the BEHAVIOR—INTEREST mechanism described herein, with the exception that rather than interests and past behavior of the first member, i.e., the searcher, the second similarity score may be utilized to weight search results based on what second members similar to the first member found interesting. Thus, activities 118 performed by the second members may be accessed from the activities database 114 and may be utilized to identify and weight search results 204 that the first member may thus be expected to find interesting.

In various examples, the first similarity score is not computed and the operations related to obtaining the first similarity score may be omitted or skipped. In such examples, the search module 108 may obtain the second similarity score for some or all of the second member profiles 116 without respect to which second member profiles 116 particularly relate to the search term 208.

Behavior—Content

In various examples, past activities 118 with content items by members of the social network 100 who are not the searcher may influence search results. The content items 120 may be member profiles 116 or other content items 120 as disclosed herein or as known in the art. The activities 118 may be with or without respect to a search that resulted in the activity 118 occurring.

As disclosed herein, an activity 118 may include viewing content 206, messaging a user associated with the content 206, sending an invitation to a user associated with the content 206, such as to connect or interview, recommending the content 206 to other users of the social network 100, and so forth. In various examples, activities 118 may be given an equal score; for instance, a number of activities 118 may simply be added up without respect to what the activity 118 is. In various examples, activities 118 may be given different scores to reflect different levels of engagement or degrees of involvement with the associated content 206. Thus, for instance, viewing the content 206 may be given a score of "1", communicating with a user associated with the content 206 may be given a score of "2", sending an invitation to the user associated with the content 206 may be given a score of "3", and so forth.

The search module 108 may obtain a first group of search results according to conventional search mechanisms, including keyword searches and other mechanisms disclosed herein as known in the art. Activities 118 associated with those search results may be obtained and assigned scores as above. Thus, if a search produces a member profile 116 for John Doe, and the profile 116 had, in the last two weeks, been viewed ten times for one point each, contacted six times for two points each, and invited to connect three times for nine points, the John Doe member profile 116 may receive a score of 10+12+9 for thirty-one (31). Some or all of the search results of the first group may receive such scores.

The scores may be weighted or otherwise adjusted based on elapsed time as described above with respect to searcher interest. Additionally, the scores may be further weighted based on the search term by which the activities 118 occurred in relation to the instant search term.

Thus, in an illustrative example, if the instant search term 208 is "software engineer" and John Doe has a member profile characteristic of "software engineer" then the score for the John Doe member profile 116 may receive a weight of 1.0, while if John Doe had a member profile characteristic of "electrical engineer" the score may be weighted with a 0.8 and a profile characteristic of "English teacher" the score may be weighted with 0.0. The weight may be multiplied by the interaction score. Thus, if John Doe were an electrical engineer the weighted interactions score may, continuing with the above example, be 31*0.8=24.8.

The search results 206 of the first group may then be ranked according to their resultant interaction scores. A second group of search results 206 may be formed that includes some or all of the search results 206 of the first group. The second group may include a predetermined number of search results 206 from the first group or some or all search results 206 of the first group that have a score that exceeds a predetermined threshold. The second group 206 may be displayed to the user in the search result window 204.

Figure 4:
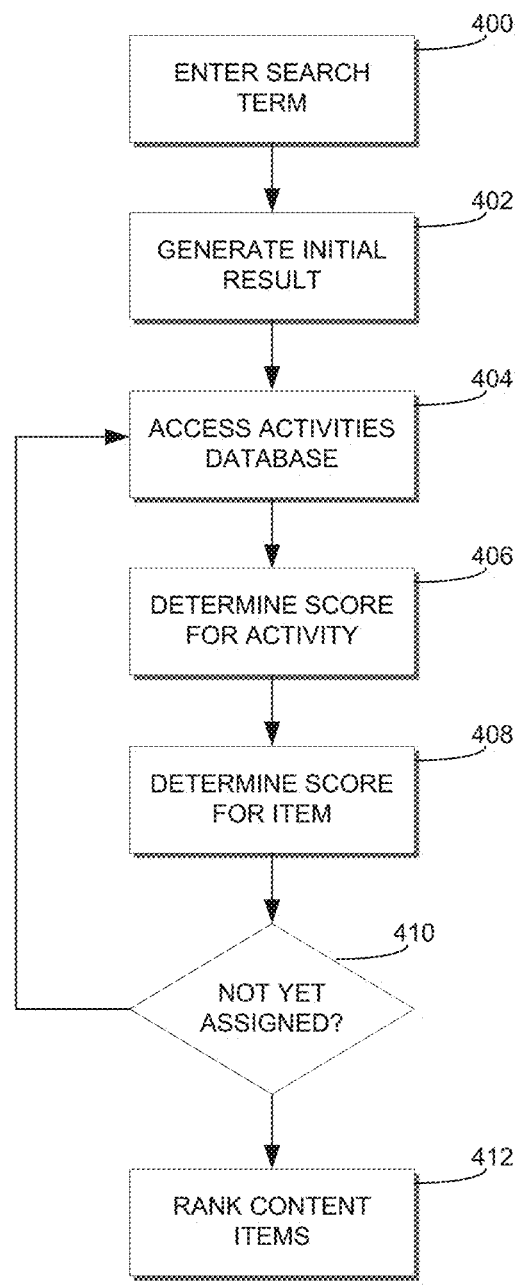
FIG. 4 is a flowchart for determining behavior interest of a first member, in an example embodiment.

FIG. 4 is a flowchart for determining behavior interest of a first member, in an example embodiment.

At 400, the searcher corresponding to the first member profile 116 enters a search term 208.

At 402, the search module 108 may generate an initial result including a first group of content items 120 from the data layer 105. The search module 108 may generate the initial result using conventional search techniques, such as keyword matching and the like.

At 404, the search module 108 may, for one of the content items 120 of the first group, access the activities database 114 for activities 118 related to that content item 120. The activities 118 may have been performed at least by second members of the social network other than the first member, though the first member may also have conducted at least one or more of the activities 118.

At 406, the search module 108 may determine an interactions score for each activity 118 associated with the content item 120. The interaction score may be based on the degree of involvement with the content item 120 represented by the activity 118, as described in detail above. The interaction score may be weighted according to an elapsed time since the interaction, as disclosed above.

At 408, an interaction score for the content item 120 may be determined by combining the interaction scores for each of the associated activities 118. The interaction score may be obtained by summing, averaging, or otherwise merging the interaction scores for each of the activities 118.

At 410, the search module 108 determines if any content items 120 of the first group have not received an interaction score. If so, the search module 108 selects a different content item 120 from the first group and returns to 404. If not, the search module 108 proceeds to 412.

At 412, the search module 108 may rank the content items 120 of the first group according to their respective interaction scores. The content items 120 may be ranked from lowest to highest according to their interactions scores alone or according to their interactions scores and other factors, such as a strength of the result of the conventional search. In such an example, the interaction score may be combined with the other factor, such as by summing, multiplying, or other operation as appropriate.

Searcher Interest and Profile Data

The search module 108 may further present search results 206 based on the comparison of the member profile 116 of the searcher against the metadata of the search results 206. The search module 108 may obtain a first group of search results 206 that may be compared against the characteristics of the member profile 116 of the searcher in the manner described herein with respect to other member profile 116 characteristics. The first group of search results 206 may be ranked according to the scores that may be generated in the manner described herein and the second group formed from the first group based on a predetermined number or of scores exceeding a predetermined threshold score. (See, e.g., U.S. Patent Application Publication No. 2014/0129552, "LEVERAGING HOMOPHILY IN RANKING SEARCH RESULTS", which is incorporated by reference herein in its entirety.)

Figure 5:
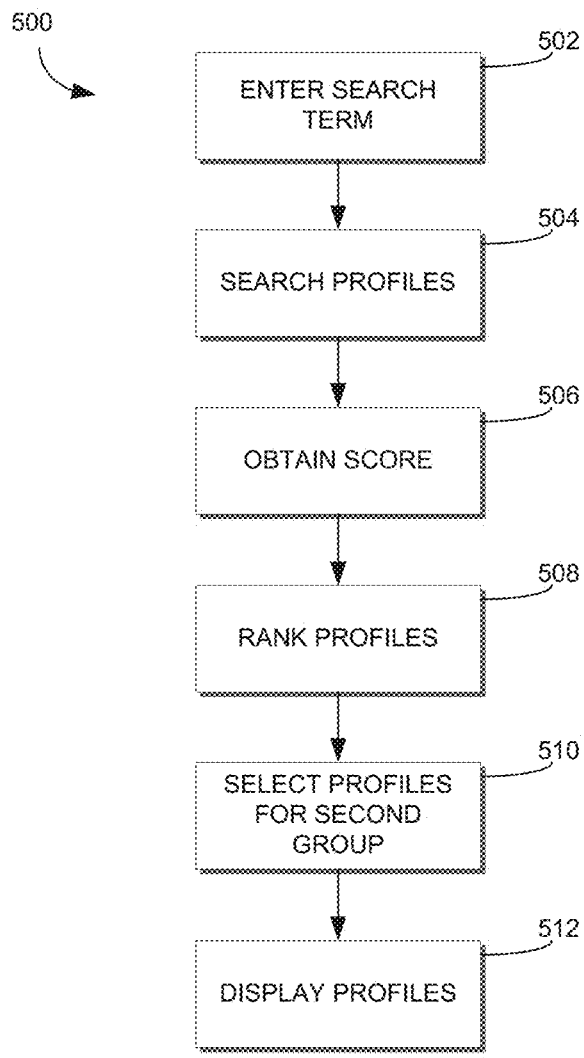
FIG. 5 is a flowchart for performing a search using a search module, in an example embodiment.

FIG. 5 is a flowchart 500 for performing a search using the search module 108, in an example embodiment. The search module 108 may incorporate some or all of the similarity, behavior searcher interest, behavior content, and searcher interest and profile data techniques disclosed herein.

At 502 a search term 208 may be entered into the search term entry line 202, such as by typing, copy-pasting, and the like. The search term 208 may include one or more clauses; for instance, a search term 208 may be "engineer" or "software engineer" or "Hadoop software engineer," and so forth.

At 504, the search module 108 searches at least some of the profiles 116 to identify profiles 116 that meet the search term 208. The search may proceed according to any of a variety of search criteria, such as keyword searches, the density of a social graph 112 corresponding to each profile 116, and so forth. The search may compare the search term against characteristics of the user from the profiles 116, the characteristics including at least some of the profile data, such as profession, current employment, previous employment, education, location, experience, and so forth, including various characteristics and profile data disclosed herein. The search may return an initial result having a predetermined number of the best results according to the basic search criteria. The predetermined number of initial results may be greater than a predetermined number of profiles 116 that may be part of the final result, for instance to allow for the selection of a subset of the initial results as the final result based on scores for the profiles 116 of the initial result.

At 506, upon receiving the initial results the search module 108 obtains a score for at least some, and in an example embodiment each of the profiles 116 of the initial results in relation to the search term 208. The scores may be obtained according to any one or more of the techniques disclosed herein. The scores may be cumulative of multiple techniques. The scores of the various techniques may be normalized or may be taken without normalizing. As such, in an example, if the results are normalized then each of the techniques may produce a top score that may be reduced to 1.0 with the rest of the scores provided by the technique reduced proportionally. Thus, if the behavior—content technique produces scores of 6, 3, and 2, those scores may be normalized to 1.0, 0.5, and 0.333. Alternatively, if the scores are not normalized then certain techniques may be allowed to create relatively large influence over the resultant ordering of the search results.

At 508, upon receiving the cumulative score for each profile 116 as identified in the initial search results, the profiles 116 are optionally ranked according to their cumulative scores across the multiple techniques. In an example, the ranking is from highest to lowest cumulative score. As such, the mathematical operation by which the cumulative scores were obtained may define the nature of the subsequent rankings.

At 510, at least some of the initial group of profiles 116 are selected as the final group of profiles 116. In an example, a predetermined number of the highest-ranked profiles 116 are selected for the final group. In an example, any profile 116 with a cumulative score higher than a predetermined threshold is selected for the final group.

At 512, at least some of the profiles 116 of the final group of profiles are displayed in the search results window 204. The profiles 116 may be displayed according to their rank within the final group of profiles. The search results window 204 may scroll to display more profiles 116 than may be displayed at any one time in the window 204.

Figure 6A:
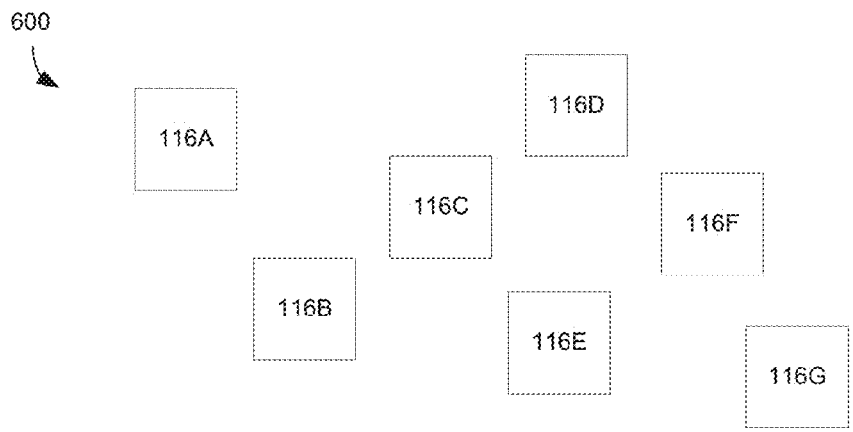
FIGS. 6A-6C is an illustration of the forming of first and second groups of profiles, in an example embodiment.

FIGS. 6A-4C is an illustration of the forming of the first and second groups of profiles 116, in an example embodiment. In FIG. 6A, the first group 600 includes profiles 116A-116G that match the search term 208 according to various search criteria. The search criteria may be conventional search criteria as described herein, such as keywords. In FIG. 6A the first group 600 may be essentially unordered or may be ordered according to a relevance to the search term 208 or other conventional search factor.

Figure 6B:
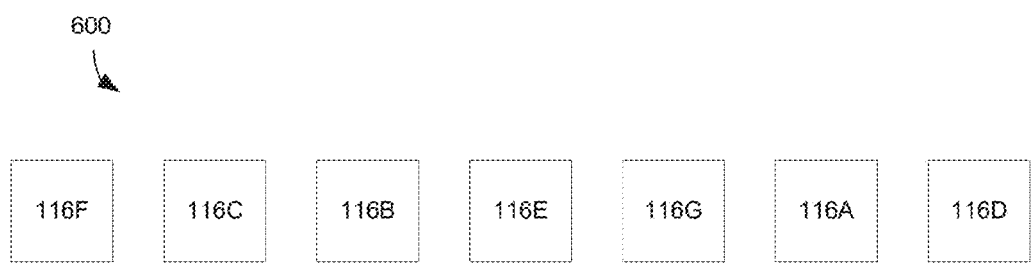
Figure 6C:
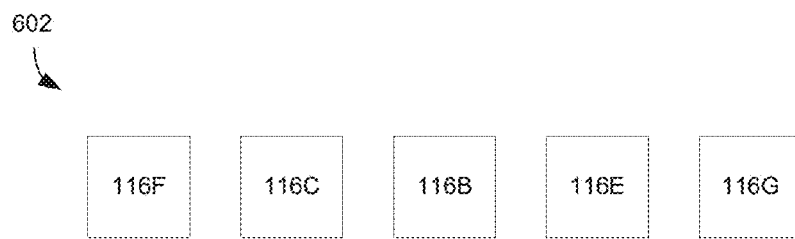

In FIG. 6B, following the search module 108 obtaining scores for each of the profiles 116 of the first group 600, the profiles 116 of the first group are ordered according to the rank of the scores of each of the profiles 116. The scores may be obtained according to any of the mechanisms described herein. In FIG. 6C, a subset of the profiles 116 of the first group 600 are formed into the second group 602. As noted herein, the second group 602 may be formed by taking the highest-scored profiles 116 up to a predetermined maximum or by taking some or all of the profiles 116 having a score higher than a predetermined threshold score. The profiles 116 of the second group 602 may then be displayed on the search interface 200.

Flowchart

Figure 7:
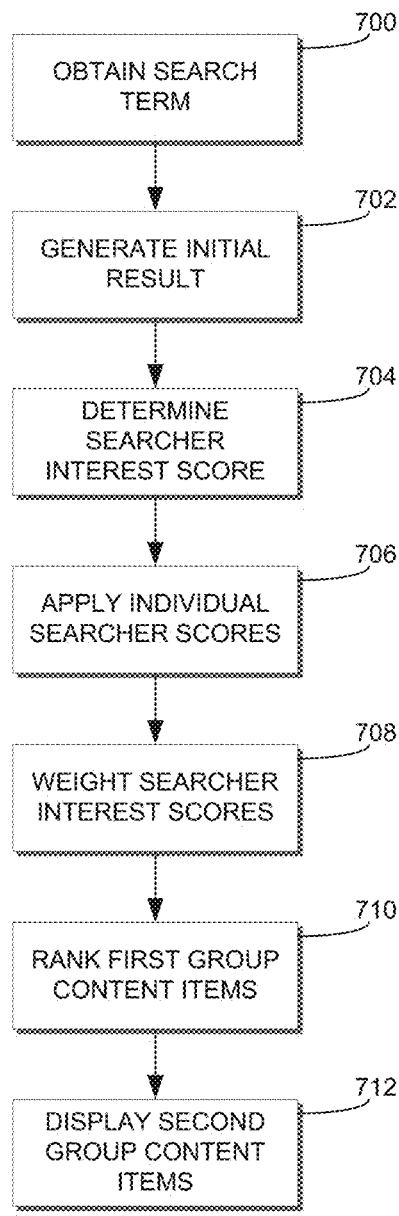
FIG. 7 is a flowchart for personalized search based on searcher interest, in an example embodiment.

FIG. 7 is a flowchart for personalized search based on searcher interest, in an example embodiment. The operations of the flowchart may be implemented on the social network 100 or any suitable equipment or system.

At operation 700, a search term is obtained, via a network interface, from a member of a social network at a user device via the network interface.

At operation 702, an initial result is generated, based on the search term, the initial result including a first group of content items from a social network and stored in a content database, the content items including member profiles of members of the social network.

At operation 704, a searcher interest score for each of the activities is individually determined. In an example, determining the searcher interest score further includes determining the search interest score for at least some of the activities based, at least in part, on a degree of interaction by the member with an associated content item as indicated by an associated activity. In an example, the degree of interaction is based, at least in part, on the member viewing the content item, positing a communication with respect to the content item, and providing an invitation to a user associated with the content item. In an example, the searcher interest score is equal among the activities.

In an example, the information indicative of the activities include metadata points and the content items of the first group include metadata points. In an example, the metadata points correspond to metadata point categories including common metadata points among the activities. In an example, each metadata point category has a metadata score based on a cumulative total of the searcher interest scores of each metadata point within the metadata point category.

At operation 706, individual searcher interest scores are applied for each of the activities to metadata points of the individual activities.

At operation 708, the searcher interest score are weighted based on an elapsed time since the activity.

At operation 710, each of the content items of the first group is ranked based, at least in part, on information indicative of activities from an activity database, the activity database storing the information indicative of activities related to the social network, the activities including interactions, via a user interface, with search results that include ones of the member profiles. In an example, activities are by the member with at least some content items not included in the first group, and the activities database further includes search histories by the member, each search history including a previous search term and search results for the search term, wherein at least some of the activities from the activity database correspond to content items from the search results included in the search histories.

In an example, ranking the content items of the first group is further based, at least in part, on the searcher interest score for each of the activities in relation to the content items of the first group. In an example, ranking the content items of the first group is further based on the metadata points of the activities in relation to the metadata points of the content items. In an example, ranking the content items of the first group is further based on the metadata score of each metadata point category that corresponds to a metadata point of each of the content items of the first group. In an example, ranking the content items of the first group is further based on combining the metadata score of each metadata point category to which each individual content item of the first group corresponds and ranking the content items of the first group according to the metadata score as combined for each content item of the first group. In an example, ranking the content items of the first group is further based, at least in part, on the searcher interest score as weighted.

At operation 712, the user device is caused to display a second group of the content items, including at least some of the first group of the content items, based, at least in part, on the rank of the first group of the content items.

System

Figure 8:
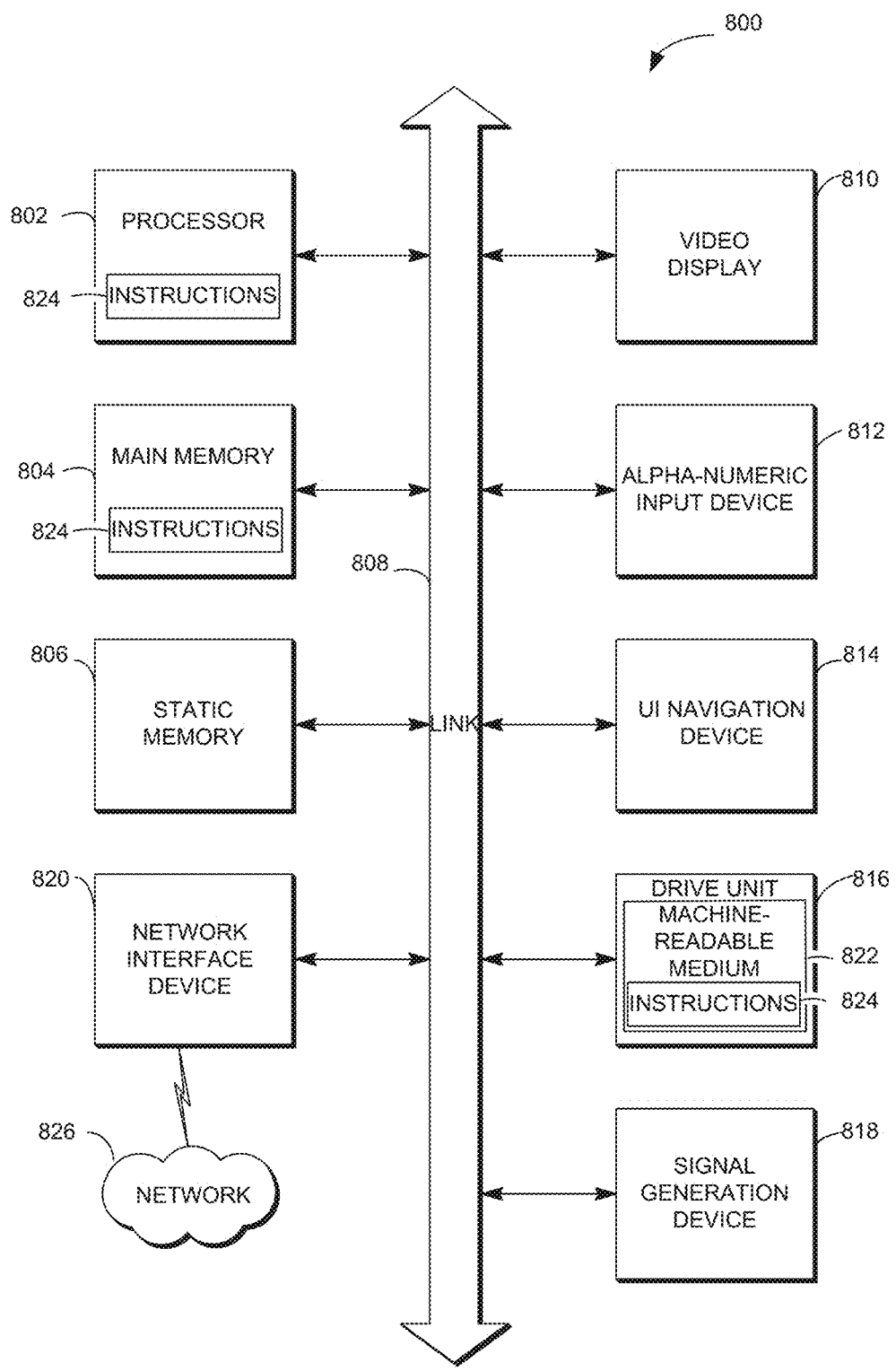
FIG. 8 is a block diagram illustrating components of a machine able to read instructions from a machine-readable medium.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, the machine 800 may implement the social network 100 and the features included and described therein. The machine 800 thus describes specific hardware configurations on which the social network 100 may be implemented and provided to users of the social network 100.

FIG. 8 shows a diagrammatic representation of the machine 800 in the example form of a computer system and within which instructions 824 (e.g., software) for causing the machine 800 to perform any one or more of the methodologies discussed herein may be executed. In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The machine 800 may further include a graphics display 810 (e.g., a plasma display panel (PDP), a light emitting diode (LED) display, a liquid crystal display (LCD), a projector, or a cathode ray tube (CRT)). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), and a network interface device 820.

The storage unit 816 includes a machine-readable medium 822 on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, during execution thereof by the machine 800. Accordingly, the main memory 804 and the processor 802 may be considered as machine-readable media. The instructions 824 may be transmitted or received over a network 826 via the network interface device 820.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 800), such that the instructions, when executed by one or more processors of the machine (e.g., processor 802), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method, comprising:
    obtaining, with a processor via a network interface, a search term from a member of a social network at a user device via the network interface;
    generating, with the processor, based on the search term, an initial result including a first group of content items from a social network and stored in a content database, the content items including member profiles of members of the social network;
    ranking, with the processor, each of the content items of the first group based, at least in part, on information indicative of activities related to the social network from an activity database, the activities including interactions, via a user interface, with search results that include ones of the member profiles;
    individually determining, with the processor, a searcher interest score for each of the activities;
    causing the user device to display a second group of the content items, including at least some of the first group of the content items, based, at least in part, on the rank of the first group of the content items, wherein ranking the content items of the first group is further based, at least in part, on the searcher interest score for each of the activities in relation to the content items of the first group, wherein the information indicative of the activities include metadata points and the content items of the first group include metadata points;
    applying, with the processor, individual searcher interest scores for each of the activities to metadata points of the individual activities; and
    wherein ranking the content items of the first group is further based on the metadata points of the activities in relation to the metadata points of the content items.

2. The method of claim 1, wherein the activities are by the member with at least some content items not included in the first group, and wherein the activities database further includes search histories by the member, each search history including a previous search term and search results for the search term, wherein at least some of the activities from the activity database correspond to content items from the search results included in the search histories.

3. The method of claim 1, wherein determining the searcher interest score further comprises determining the search interest score for at least some of the activities based, at least in part, on a degree of interaction by the member with an associated content item as indicated by an associated activity.

4. The method of claim 3, wherein the degree of interaction is based, at least in part, on the member viewing the content item, positing a communication with respect to the content item, and providing an invitation to a user associated with the content item.

5. The method of claim 1, wherein the searcher interest score is equal among the activities.

6. The method of claim 1, wherein the metadata points correspond to metadata point categories including common metadata points among the activities;
    wherein each metadata point category has a metadata score based on a cumulative total of the searcher interest scores of each metadata point within the metadata point category; and
    wherein ranking the content items of the first group is further based on the metadata score of each metadata point category that corresponds to a metadata point of each of the content items of the first group.

7. The method of claim 6, wherein ranking the content items of the first group is further based on combining the metadata score of each metadata point category to which each individual content item of the first group corresponds and ranking the content items of the first group according to the metadata score as combined for each content item of the first group.

8. The method of claim 1, further comprising weighting the searcher interest score based on an elapsed time since the activity; and
    wherein ranking the content items of the first group is further based, at least in part, on the searcher interest score as weighted.

9. A computer readable medium comprising instructions that, when executed on a processor, cause the processor to implement operations comprising:
    obtaining, via a network interface, a search term from a member of a social network at a user device via the network interface;
    generating, based on the search term, an initial result including a first group of content items from a social network and stored in a content database, the content items including member profiles of members of the social network;
    ranking, each of the content items of the first group based, at least in part, on information indicative of activities related to the social network from an activity database, the activities including interactions, via a user interface, with search results that include ones of the member profiles;
    individually determining, with the processor, a searcher interest score for each of the activities;
    causing the user device to display a second group of the content items, including at least some of the first group of the content items, based, at least in part, on the rank of the first group of the content items, wherein ranking the content items of the first group is further based, at least in part, on the searcher interest score for each of the activities in relation to the content items of the first group, wherein the information indicative of the activities include metadata points and the content items of the first group include metadata points;

applying individual searcher interest scores for each of the activities to metadata points of the individual activities; and wherein ranking the content items of the first group is further based on the metadata points of the activities in relation to the metadata points of the content items.

10. The computer readable medium of claim 9, wherein the activities are by the member with at least some content items not included in the first group, and wherein the activities database further includes search histories by the member, each search history including a previous search term and search results for the search term, wherein at least some of the activities from the activity database correspond to content items from the search results included in the search histories.

11. The computer readable medium of claim 9, wherein determining the searcher interest score further comprises determining the search interest score for at least some of the activities based, at least in part, on a degree of interaction by the member with an associated content item as indicated by an associated activity.

12. The computer readable medium of claim 11, wherein the degree of interaction is based, at least in part, on the member viewing the content item, positing a communication with respect to the content item, and providing an invitation to a user associated with the content item.

13. The computer readable medium of claim 9, wherein the searcher interest score is equal among the activities.

14. The computer readable medium of claim 9, wherein the metadata points correspond to metadata point categories including common metadata points among the activities;

wherein each metadata point category has a metadata score based on a cumulative total of the searcher interest scores of each metadata point within the metadata point category; and wherein ranking the content items of the first group is further based on the metadata score of each metadata point category that corresponds to a metadata point of each of the content items of the first group.

15. The computer readable medium of claim 14, wherein ranking the content items of the first group is further based on combining the metadata score of each metadata point category to which each individual content item of the first group corresponds and ranking the content items of the first group according to the metadata score as combined for each content item of the first group.

16. The computer readable medium of claim 9, further comprising weighting the searcher interest score based on an elapsed time since the activity; and wherein ranking the content items of the first group is further based, at least in part, on the searcher interest score as weighted.

17. A system, comprising:
a computer readable medium comprising instructions that, when executed on a processor, cause the processor to implement operations comprising:

obtaining, via a network interface, a search term from a member of a social network at a user device via the network interface;

generating, based on the search term, an initial result including a first group of content items from a social network and stored in a content database, the content items including member profiles of members of the social network;

ranking, each of the content items of the first group based, at least in part, on information indicative of activities related to the social network from an activity database, the activities including interactions, via a user interface, with search results that include ones of the member profiles;

individually determining, with the processor, a searcher interest score for each of the activities;

causing the user device to display a second group of the content items, including at least some of the first group of the content items, based, at least in part, on the rank of the first group of the content items, wherein ranking the content items of the first group is further based, at least in part, on the searcher interest score for each of the activities in relation to the content items of the first group, wherein the information indicative of the activities include metadata points and the content items of the first group include metadata points;

applying individual searcher interest scores for each of the activities to metadata points of the individual activities; and wherein ranking the content items of the first group is further based on the metadata points of the activities in relation to the metadata points of the content items.

18. The system of claim 17, wherein the activities are by the member with at least some content items not included in the first group, and wherein the activities database further includes search histories by the member, each search history including a previous search term and search results for the search term, wherein at least some of the activities from the activity database correspond to content items from the search results included in the search histories.

19. The system of claim 17, wherein determining the searcher interest score further comprises determining the search interest score for at least some of the activities based, at least in part, on a degree of interaction by the member with an associated content item as indicated by an associated activity.

20. The system of claim 17, further comprising the processor.

* * * * *